Sept. 21, 1971           T. O. PAINE            3,606,979
ADMINISTRATOR OF THE NATIONAL AERONAUTICS
AND SPACE ADMINISTRATION
EXPANSIBLE SUPPORT MEANS
Filed Oct. 6, 1969
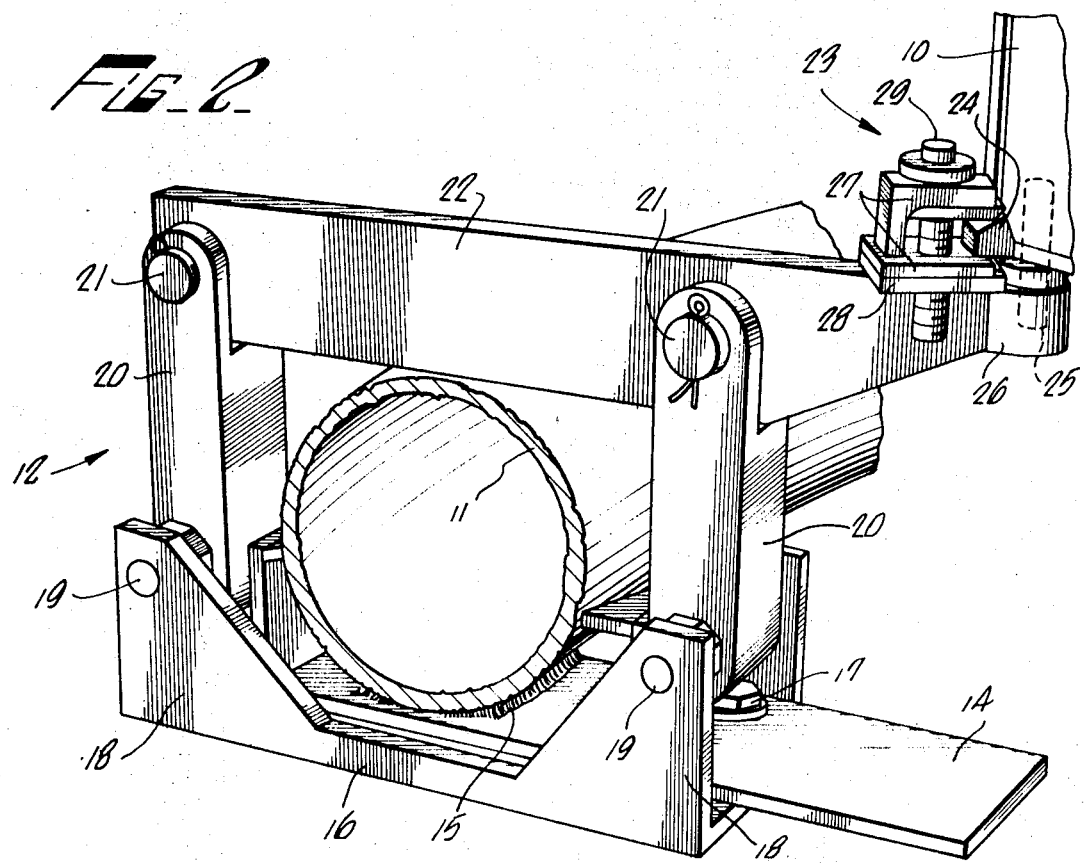
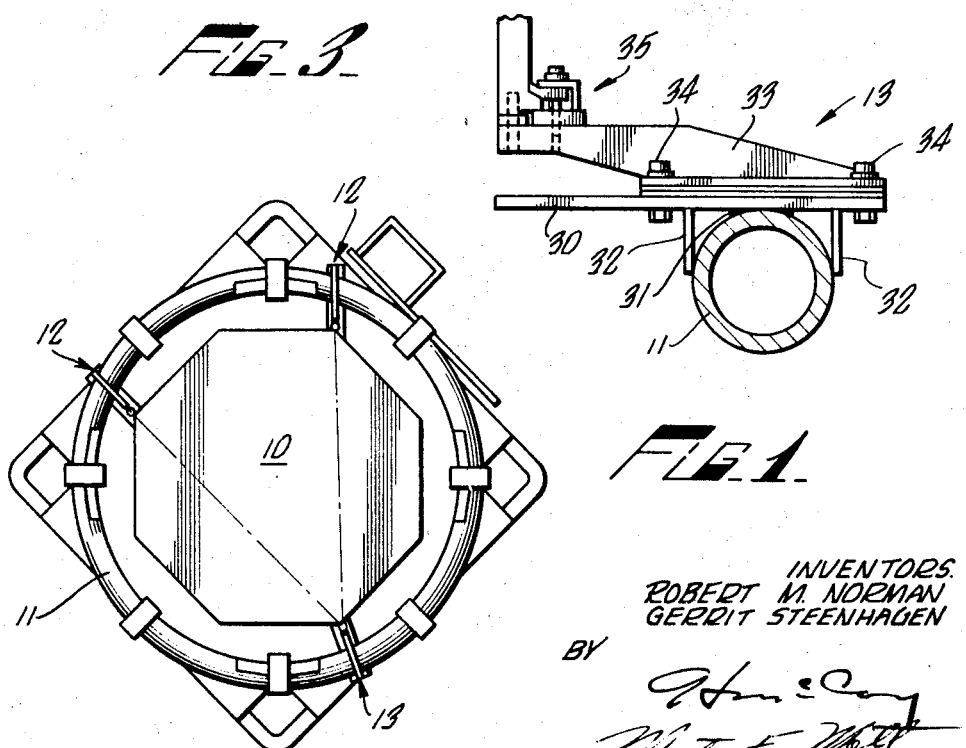
INVENTORS.
ROBERT M. NORMAN
GERRIT STEENHAGEN
BY
ATTORNEYS.

United States Patent Office 3,606,979
Patented Sept. 21, 1971

3,606,979
EXPANSIBLE SUPPORT MEANS
T. O. Paine, Administrator of the National Aeronautics and Space Administration, with respect to an invention of Robert M. Norman, Glendale, and Gerrit Steenhagen, Montrose, Calif.
Filed Oct. 6, 1969, Ser. No. 864,020
Int. Cl. F16m 1/00
U.S. Cl. 248—14
5 Claims

ABSTRACT OF THE DISCLOSURE

A base support for providing an expansible and contractible coupling between two members is disclosed, having a pair of laterally movable mounts and a rigid mount circumferentially spaced about a support ring comprising the first member. Each movable mount includes a four bar linkage arrangement in which the top horizontal bar is connected to the supported second member. The rigid mount is also connected to the supported second member, with the four bar linkage arrangements being oriented in such a manner that the axes of their respective lateral movements intersect the rigid mount. As a result, the movable mounts compensate for the thermal contraction and expansion of either of the members while still permitting the second member to be rigidly secured to the support ring.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The present invention relates to an improved mounting means for supportingly coupling two members; each of which being subject to a great amount of thermal expansion or contraction.

(2) Description of the prior art

In mounting heavy machinery onto a support structure in an environment of widely varying temperatures both the machinery and the support structure become subject to great strains due to the unequal expansion and contraction of the members exposed to the temperature changes. For example, in large heat exchangers the temperature difference between the heat exchangers and the support structures varies greatly. The customary way of supporting such heat exchangers is by mounting them on a plurality of circumferentially spaced sliding pad type mountings which, in turn, rest directly on the support structure. However, a serious problem with such a coupling is that the two members are not rigidly connected to each other, thereby rendering the machinery unsecure for various purposes, especially when the support structure is resiliently mounted. Furthermore, since these sliding mountings have a low coefficient of friction, some forces are still transmitted between the member during expansion or contraction of one of the members, which could have a harmful effect to the other member.

Another example of such an environment occurs in conducting thermal proof testing of spacecraft where each spacecraft rests on a large support ring which the test specification requires to be chilled by circulating liquid nitrogen. Naturally, since all testing is not continuous, the support ring alternately contracts and expands during periods of use and non-use. During this expansion or contraction, if the spacecraft were rigidly attached to the support ring, structurally destructive force would be set up in the spacecraft which could also distort and upset sensitive measurements mounted on the spacecraft.

OBJECTS AND SUMMARY OF THE INVENTION

The present invention obviates the above mentioned shortcomings by providing an expansible and contractible coupling means between two members to compensate for the thermal contraction and expansion of either of the members while still permitting the members to be rigidly secured to each other. The first member includes a support ring utilized as a base support for the second member. The coupling means comprises a pair of laterally movable mounts and a rigid mount circumferentially spaced about the support ring. Each movable mount includes a four bar linkage arrangement having a bottom horizontal bar integrally connected to the support ring, a pair of vertical bars having lower extremities pivotally connected to the bottom horizontal bar, and upper extremities pivotally connected to a top horizontal bar. The top horizontal bars are also connected to the second member for supporting the second member, with the top bars oriented in such a manner that the axes of their respective lateral movements intersect the rigid mount, thereby fulfilling a primary object of the invention, i.e. providing a rigid coupling and support means between two members while compensating for any expansion or contraction therebetween.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a top plan view of a test article being supported on a test bed by coupling means of the present invention;

FIG. 2 is a perspective view of one of the four bar linkage arrangements of the present invention; and FIG. 3 is an elevational view, partly in section, of the fixed mount of the present invention.

DESCRIPTION OF THE PREFERRED EMBODIMENT

The preferred embodiment of the invention is utilized as a test mount in temperature varying environments where the member acting as a base support for the article under test is subject to expansion-contraction movements which normally would distort and upset sensitive measurements mounted on the test article. In the particular embodiment illustrated, a spacecraft 10 undergoing thermal proof testing is supported on a support ring 11 in a space simulator. The support ring 11 is required by the test specification to be chilled by circulating liquid nitrogen. As stated previously, during the transition periods of use and non-use, the support ring 11 alternately contracts and expands, and if the spacecraft 10 were rigidly attached to the support ring 11, structurally destructive forces would be set up in the spacecraft 10. To prevent such damage to the spacecraft 10, a support and coupling means is provided to interconnect the members to provide compensation for the contraction and expansion of the support base 11. The coupling means includes a pair of laterally movable mounts 12 and a fixed mount 13 circumferentially spaced about the support ring 11.

FIG. 2 shows one of the movable mounts 12 which is comprised of a four bar linkage arrangement having a bottom horizontal bar 14 integrally connected to the bottom sector of the support ring 11 by a weld 15. The bottom horizontal bar 14 is also integrally connected to a U-shaped channel 16 by means of a pair of bolts 17 (of which one is shown). The extremities of the channel 16 form a pair of vertically extending bifurcates 18 which are utilized to retain a pair of transversely extending pivot pins 19. These pivot pins 19 support the lower extremities of a pair of vertical bars 20. The upper extremities of the vertical bars 20 retain a second set of pivot pins 21 for pivotally supporting a top horizontal bar 22. The interior extremity of the top horizontal bar 22 is provided with a clamping arrangement 23 for securing a radially extending foot 24 of the spacecraft 10. The clamping arrangement 23 includes a vertical pin 25 (shown in phantom) extending through the end 26 of the horizontal bar 22 and into a bore formed within the bottom surface of the spacecraft 10. The clamping arrangement 23 also includes a pair of vice members 27 attached to a plate 28 which is integrally connected to the horizontal bar 22. The vice members 27 extend over the foot 24 and are adapted to be drawn together by means of a tightening screw 29 extending therethrough.

FIG. 3 shows the rigid mount 13 construction having a bottom plate 30 integrally connected to the support ring 11 by a weld 31. A pair of braces 32 extend downwardly from the plate 30 and engage the support ring 11 for greater structural support. The rigid mount 13 also includes a support bar 33 bolted to the base 31 by means of a pair of bolts 34. The interior extremity of the support bar 33 includes a clamping arrangement 35, identical to the clamping arrangement 23, which is adapted to be secured to a spacecraft foot 24. It is preferred that the rigid and movable mounts be made of polished stainless steel, and be maintained at the same temperature as the spacecraft foot 24 by means of heaters (not shown).

OPERATION

As can be seen, the movable and fixed mounts 12 and 13 function as a coupling and support between the support ring 11 and the spacecraft 10. In the movable mounts 12, the horizontal bars 18 and 22 and the vertical bars 20 constitute the four bar linkage which normally has a rectangular shape, but which can be distorted in both directions, as necessary, to form a parallelogram to accommodate the changing support requirements for the spacecraft occasioned by the contraction and expansion of the support ring 11. As more clearly shown in FIG. 1, the movable mounts are orientated in such a manner that the top horizontal bars 22 are laterally movable and are oriented in such a manner that the axis of their respective compensatory movements intersect at the rigid mount. This orientation is preferable since the two members are rigidly coupled at the mount 13 and the support ring 11 would expand or contract in those directions at the mounts 12.

As a result, the support ring 11 is capable of expanding or contracting with such movements being compensated by the movable mounts 12 while the coupling means still provides a rigid support for the spacecraft.

It should be noted that various modifications can be made to the apparatus while still remaining within the purview of the following claims.

What is claimed is:
1. In combination with a first support member and a second member which is adapted to be mounted on said first support member in an environment where the two members are subject to varying temperatures, coupling means comprising:
  a pair of movable mount means peripherally spaced about said first support member for interconnecting said second member to said first member, each of said mount means being movable along an axis; and
  rigid mount means spaced from said movable mounts on said first member for interconnecting said second member to said first member, said movable mount means being oriented in such a manner that the axes of their movements intersect said rigid mount means to compensate for any contraction or expansion of either of said members while still providing a rigid support therebetween.
2. The combination of claim 1 wherein said first member is a support ring extending about said second member.
3. The combination of claim 1 wherein each of said movable mount means comprises a four bar linkage arrangement which includes:
  a first horizontal bar connected to said first member;
  a pair of vertical bars pivotally connected to said first horizontal bar; and
  a second horizontal bar pivotally connected to said pair of vertical bars, also being connected to said second member in such a manner that the axis of the lateral movement of each second bar intersects the rigid mount means.
4. The invention of claim 2 wherein each of said movable mount means comprises a four bar linkage arrangement which includes:
  a first horizontal bar connected to said support ring;
  a pair of vertical bars pivotally connected to said first horizontal bar; and
  a second horizontal bar pivotally connected to said pair of vertical bars, also being connected to said second member in such a manner that the axis of the lateral movement of each second bar intersects the rigid mount means.
5. The invention of claim 4 wherein said second member is a spacecraft mounted on said support ring for thermal proof testing.

References Cited

UNITED STATES PATENTS

| | | | |
|---|---|---|---|
| 2,464,356 | 3/1949 | Stearns | 248—146 |
| 2,475,109 | 7/1949 | Pendleton | 248—146 |
| 2,554,130 | 5/1951 | Strunk | 165—82 |
| 2,761,639 | 9/1956 | Horn | 248—17 |

J. FRANKLIN FOSS, Primary Examiner

U.S. Cl. X.R.

14—16; 52—573; 165—82; 248—DIG 1